United States Patent [19]

Thompson

[11] Patent Number: 4,464,683

[45] Date of Patent: Aug. 7, 1984

[54] DIGITAL RECORDING OF TELEVISION COMPONENTS WITH IMPROVED TRANSITION SPACING

[75] Inventor: Charles R. Thompson, Moorestown, N.J.

[73] Assignee: RCA Corporation, New York, N.Y.

[21] Appl. No.: 338,861

[22] Filed: Jan. 12, 1982

[51] Int. Cl.³ .................. H04N 9/32; H04N 5/76; H03K 13/01
[52] U.S. Cl. .................. 358/310; 358/13; 375/25
[58] Field of Search .......... 358/310, 13; 360/38.1, 360/39, 40, 41, 32; 375/17, 19, 25, 34; 371/2, 55, 56, 25, 34; 370/312, 318

[56] References Cited

U.S. PATENT DOCUMENTS 4,277,807  7/1981  Baldwin ...................... 360/32

OTHER PUBLICATIONS

Optimal Codes for Digital Magnetic Recording, An article published in *The Radio and Electronic Engineer*, vol. 47, pp. 172-176, Apr. 1977.

Primary Examiner—John C. Martin
Assistant Examiner—E. A. McDowell
Attorney, Agent, or Firm—E. M. Whitacre; W. H. Meise; H. I. Steckler

[57] ABSTRACT

A recording system converts standard binary signals into new binary signals that have mostly zeroes occurring in words that are physically unrealizable. Thus when NRZ-I recording is used, long strings of zeroes (which have no transitions in them for easy detection) do not actually occur. Ones do have transitions in them for easy detection, and thus a long string of ones causes no detection problem. The physically unrealizable combinations occur due to the partial correlations of signals, such as Y, B-Y, and R-Y color signals.

16 Claims, 5 Drawing Figures

DIGITAL RECORDING OF TELEVISION COMPONENTS WITH IMPROVED TRANSITION SPACING

BACKGROUND OF THE INVENTION

The present invention relates to transmission of sampled correlated signals, and more particularly to recording digital television signals.

One type of recording format is NRZ (non-return-to-zero), in which a high logic level or digital one is recorded using a current of a first polarity through a magnetic recording head and a low logic level or digital zero is recorded using a current of a second opposing polarity through said head. Since for the entire duration of a one or a zero, the current has the respective polarity and constant amplitude, i.e. does not return to zero current to provide a clocking bit, a high recording density is obtained. This results in lower tape usage and cost, as well as permitting smaller cassettes for the same tape length or recording time and VTR (video tape recorder). However, if a long sequence of ones or zeroes occurs, the current will maintain its particular polarity and amplitude for the duration of the sequence, resulting in a long length of constant magnetization on the tape. This makes distinguishing between successive ones or zeroes during playback difficult. A partial solution to the problem is to use a modification of NRZ recording called "NRZ-I" (non-return- to-zero-interleaved). In this type of recording, a head current transition, and thus a recorded flux transition occurs during the middle of a one signal. This transition makes ones easy to detect, and further, NRZ-I is easier to implement than pure NRZ recording. However, with NRZ-I, recording a long sequence of all zeroes, or zeroes with only a small number of ones, still makes detection of individual bits difficult.

It is therefore desirable to provide a high recording density with easy detection of successive bits.

SUMMARY OF THE INVENTION

Methods and apparatus for recording a plurality of at least partially correlated digital words wherein some combinations of said plurality of words are physically unrealizable, comprising assigning code words to digital words, code words having digits of mostly the same selected polarity being assigned to physically unrealizable combinations of digital words, and transmitting said code words in non-return-to-zero-interleaved format.

DETAILED DESCRIPTION

When recording color video signals, two general methods can be used, namely recording a composite color signal and recording component signals, such as Y, R-Y, and B-Y. Of the two methods, component signal recording is preferred when high quality is to be maintained since certain processing operations, such as special effects, work best with component signals, and further composite signals cannot be perfectly separated into component signals. Therefore, the present invention relates to recording of component signals. However, component signals, such as Y, R-Y, and B-Y, are partially correlated, i.e., partially dependent upon each other.

Figure 1:
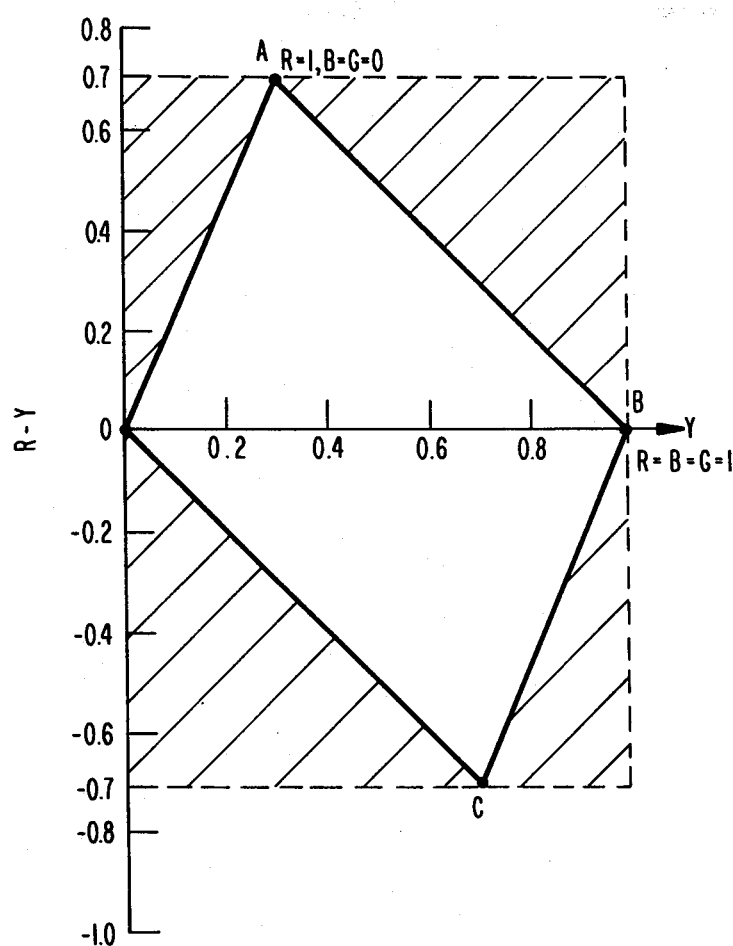
FIG. 1 is a graph useful in explaining the principle of the invention.

This is illustrated in FIG. 1, where the horizontal axis represents the Y signal and the vertical axis represents the R-Y color difference signal. To construct the graph the equation $Y=0.1B+0.3R+0.6G$ is used, which is a reasonably accurate approximation of the exact value of the percentages of B, R, and G in the Y signal, and further, it is assumed that the R, G, and B signals each have a normalized dynamic range of 0 to 1. The signal R-Y is equal to $R-(0.1B+0.3R+0.6G)=-0.1B+0.7R-0.6G$. When $R=B=G=0$, both signals R-Y and Y are 0, which is represented by origin point 0 in FIG. 1. When $R=1$ and $B=G=0$, then $R-Y=-0.1(0)+0.7(1)-0.6(0)=0.7$ and $Y=0.1(0)+0.3(1)+0.6(0)=0.3$ which is represented by point A. When $R=B=G=1$, then $Y=0.1(1)+0.3(1)+0.6(1)=1$ and $R-Y=-0.1(1)+0.7(1)-0.6(1)=0$, which is represented by point B. When $R=0$ and $B=G=1$, then $R-Y=-0.1(1)+0.7(0)-0.6(1)=-0.7$ and $Y=0.1(1)+0.3(0)+0.6(1)=0.7$, which is represented by point C.

The interior area bounded by parallelogram 0ABC represents all possible combinations of the signals Y and R-Y, while the shaded area represents physically unrealizable combinations of said signals. These unrealizable combinations are due to the fact that the Y and R-Y signals are partially correlated with each other.

A similar diamond shaped figure results when the B-Y signal is graphed versus the Y signal, although the exact numbers are different. For example, the signal $B-Y=1B-(0.1B+0.3R+0.6G)=0.9B-0.3R-0.6G$. If at one extreme of the B-Y signal $B=1$ and $R=G=0$, then the B-Y signal equals 0.9, while, if at the other extreme $B=0$ and $R=G=1$, then $B-Y=-0.3-0.6=-0.9$. Again a shaded area can be drawn representing physical unrealizable combinations of the Y and B-Y signals.

The present invention records color television component signals using the NRZ-I recording method by assigning code words having only a small number of ones, or no ones at all, to physically unrealizable combinations of the signals. Since such combinations do not actually occur, no problem with bit detection occurs.

Figure 2:
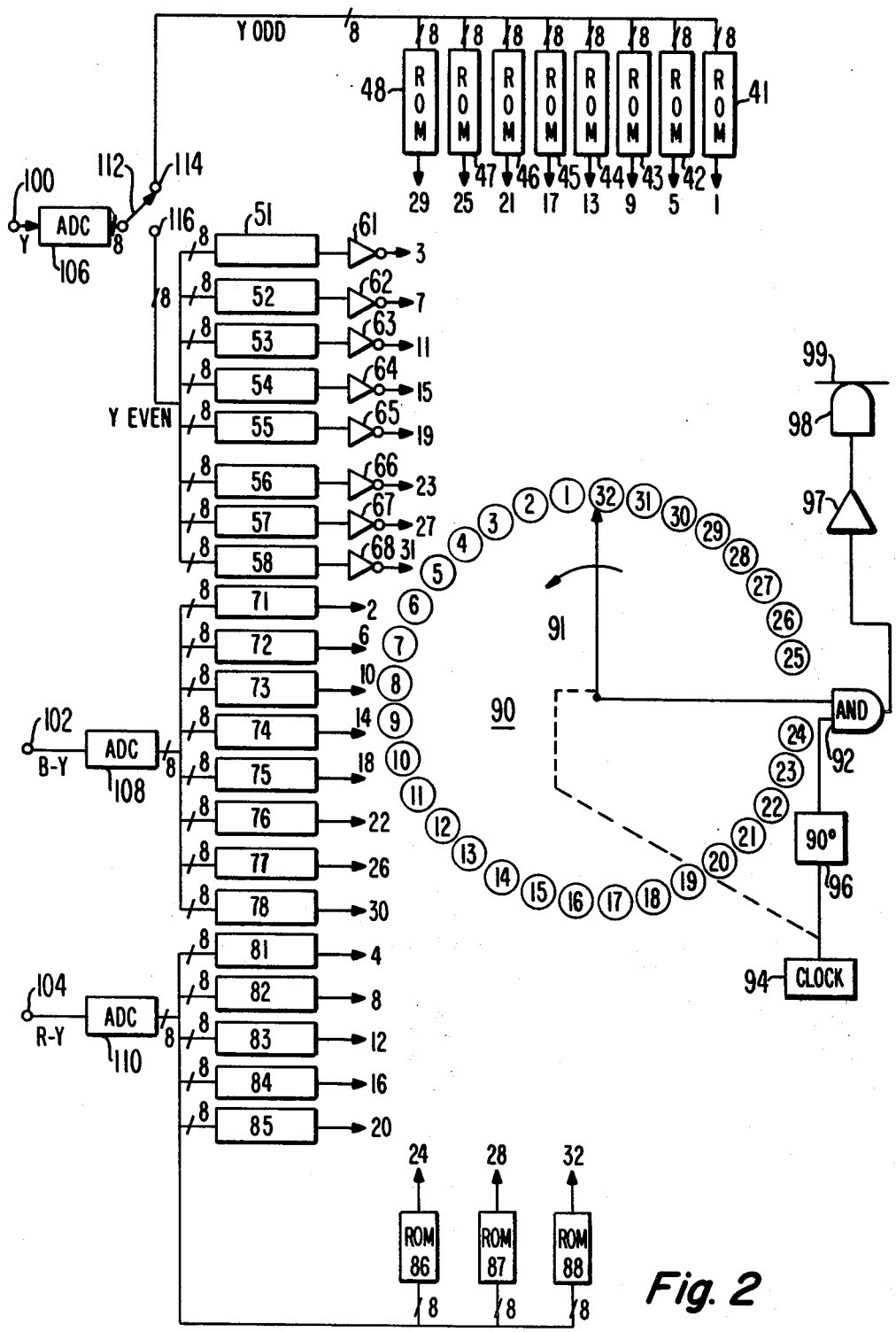
FIG. 2 is a block diagram of a recorder-encoder in accordance with the invention.

FIG. 2 shows a block diagram of an embodiment of an encoder in accordance with the invention. Input terminals 100, 102, and 104 receive analog Y (luminance), B-Y, and R-Y signals respectively. These signals can be derived by matrixing R (red), B (blue), and G (green) signals that are provided by the imagers of a television camera (not shown), a VTR (not shown), or other signal source. The analog Y, B-Y, and R-Y signals are applied to ADCs (analog-to-digital converters) 106, 108, and 110, respectively, which sample and then quantize the analog signals. For the Y signal, the sampling typically takes place at four times the color subcarrier frequency (14.32 MHz for NTSC) although a recently agreed upon world standard of 13.5 MHz can also be used. The B-Y and R-Y signals are typically sampled at one-half the rate of the Y signal, e.g. 7.16 MHz, since their bandwidth is less than that of the Y signal. The present invention requires the B-Y, R-Y, and corresponding Y samples to be cosited (derived from the same spatial location), as is almost always the case. The quantizing of digital signals is almost universally carried out with 8 bits (256 grey levels) of resolution for video signals and this will be assumed herein, although other numbers of levels can be used.

The 8-bit digital Y signal is applied to 8-bit switch (8 poles, one for each bit) 112. The input signal of switch 112 is alternately applied to 8-bit outputs (8 outputs, one for each bit) 114 and 116. Switch 112 alternates between outputs 114 and 116 at one-half the sampling rate of the Y signal, and thus must be an electronic switch, although shown as a mechanical switch for clarity. Hence, alternate samples are applied to outputs 114 and 116, which alternate samples have been called $Y_{odd}$ and $Y_{even}$, respectively.

The $Y_{odd}$ signal is applied to the 8-bit address inputs of ROMs (read only memories) 41-48, while the $Y_{even}$ signal is applied to the 8-bit address inputs of ROMs 51-58. Similarly, the digitized B-Y signal is applied to the 8-bit address inputs of ROMs 71-78, while the digitized R-Y signal is applied to the 8-bit address inputs of ROMs 81-88. ROMs 41-58 and 71-88 all have 1-bit outputs and since there are 8 ROMs for each signal, there are still 8-bits per signal. ROMs having a number ending in 1 provide the MSB (most significant bit) of a new binary code (explained below), while ROMs having a number ending in 8 provide the LSB (least significant bit) of said new binary code. The ROMs convert the respective incoming signals so that physically realizable combinations of signals have a maximum number of ones in a manner explained below. In general, low amplitude signals will be assigned to code words having large numbers of zeroes. To avoid having a low amplitude flat luminance field being represented by code words having many zeroes, the outputs of ROMs 51-58 are coupled to inverters 61-68, respectively. This ensures that either $Y_{odd}$ or $Y_{even}$ is represented by at least a fair number of ones.

Switch 90 has a total of 32 contacts consecutively numbered 1 to 32 in the order in which they are contacted by center arm 91 under the control of a signal from clock 94. The outputs of ROMs 41 to 48 and 71 to 88 and inverters 61 to 68 are applied to contacts as numbered at the respective outputs as shown in FIG. 2. Adjacent ROMs (or inverters as the case may be) for processing a single one of the signals are connected to every fourth contact of switch 90. Thus the output signal from switch 90 starting from contact 1 is provided by ROM 41 (a $Y_{odd}$ signal), from contact 2 is provided by ROM 71 (a B-Y signal), from contact 3 is provided by inverter 61 (a $Y_{even}$ signal), from contact 4 is provided by ROM 81 (an R-Y signal), from contact 5 is provided by ROM 42 ( a $Y_{odd}$ signal), etc. It will be seen that the output signal from switch 90 has the sequential form $Y_{odd}$, B-Y, $Y_{even}$, R-Y, $Y_{odd}$, B-Y, $Y_{even}$, R-Y, etc. If the Y signal sampling is at four times color subcarrier frequency (14.32 MHz), and since the four input signals to the ROMs are sampled at 7.16 MHz (dividing the Y signal in half into $Y_{odd}$ and $Y_{even}$ divides the sampling frequency in half), the 32 serial output bits of switch 90 must occur at 7.16 MHz (sampling rate per signal) multiplied by 4 signals multiplied by 8 bits per signal, which equals 229.12 MHz. If 13.5 MHz sampling of the Y signal is used, the result is 216 MHz. In either case it is obvious that switch 90 must actually be an electronic switch and not a mechanical one as shown for simplicity.

The output signal from switch 90 can be directly recorded in NRZ form. To convert it to NRZ-I, it is applied to one input of AND gate 92. The other input of gate 92 receives a clock signal from clock 94. The clock signal has the same frequency as that applied to control the switching of switch 90, but with a 90-degree phase shift provided by digital phase shifter 96. The output signal from gate 92, when the output signal from switch 90 is a one, thus has a level transition in the middle thereof, as required for NRZ-I.

The NRZ-I signal is applied to amplifier 97 and then to recording head 98 for recording on magnetic tape 99. Although only linear recording is symbolically shown in FIG. 2, it will be appreciated that other forms of recording, such as quadruplex or helical-scan can be used, as is known in the art. The signal from clock 94 can be divided in frequency by 16 to control ADC 106. This divided signal in turn can be further frequency divided by 2 to control ADCs 108 and 110 and switch 112.

The conversion carried out by the ROMs will now be explained in conjunction with Table I below. For purposes of simplicity, this table uses 4-bit input and output signals, however the principle is the same for 8-bit signals.

TABLE I

| 1<br>Analog Level<br>(Word No.) | 2<br>Standard<br>Binary | 3<br>New<br>Binary | 4<br>No. of ones in<br>New Binary |
|---|---|---|---|
| 16 | 1111 | 1111 | 4 |
| 15 | 1110 | 1110 | 3 |
| 14 | 1101 | 1101 | 3 |
| 13 | 1100 | 0111 | 3 |
| 12 | 1011 | 1011 | 3 |
| 11 | 1010 | 1010 | 2 |
| 10 | 1001 | 1001 | 2 |
| 9 | 1000 | 0011 | 2 |
| 8 | 0111 | 1100 | 2 |
| 7 | 0110 | 0110 | 2 |
| 6 | 0101 | 0101 | 2 |
| 5 | 0100 | 0100 | 1 |
| 4 | 0011 | 1000 | 1 |
| 3 | 0010 | 0010 | 1 |
| 2 | 0001 | 0001 | 1 |
| 1 | 0000 | 0000 | 0 |

Column 1 indicates the analog level and word number, which ranges from 1 to 16, and respectively represents normalized ranges of, e.g., 0 to 1 for Y (both odd and even), −0.7 to +0.7 for R-Y, and −0.9 to +0.9 for B-Y. Column 2 is how standard binary would represent the word numbers. Column 3 shows how any one of the ROMs changes the binary code, if at all (not all standard binary members are changed) into a new binary code. Column 4 lists the number of ones in each of the new binary code words. It will be seen that there is one new binary word that has 4 ones, four words that have 3 ones, six words that have 2 ones, four words that have 1 one, and one word that has 0 ones. In general, the exact new binary word that is assigned to a standard binary word is not important, as long as the number of ones in the new binary word is about as shown in column 4. Although the new binary code differs from the standard binary code in only four of the 16 analog levels shown above, when using an 8-bit code with 256 analog levels, the improvement is more noticeable.

Table II below summarizes the situation for an 8-bit code conversion.

TABLE II

| No. of ones | No. of Words |
| --- | --- |
| 0 | 1 |
| 1 | 8 |
| 2 | 28 |
| 3 | 56 |
| 4 | 70 |
| 5 | 56 |
| 6 | 28 |
| 7 | 8 |
| 8 | 1 |
| Total No. of Words = | 256 |

The left column shows the number of ones in the new binary words, while the right column shows the number of new binary words that have the number of ones shown on the same line of the left column. The analog level corresponds on a 1 to 256 scale to that of the 1 to 16 scale of the 4-bit case. Expressed as a percentage of full scale of the analog level, 0 percent, i.e., word number 1, has no ones, i.e., it is all zeroes, the standard binary words from just above 0 percent to about 3.5 percent are converted into new binary words that have 1 one, the new binary words from about 3.5 percent to about 14 percent have 2 ones, the new binary words from about 14 percent to about 36 percent have 3 ones, the new binary words from about 36 percent to about 64 percent have 4 ones, the new binary words from about 64 percent to about 86 percent have 5 ones, the new binary words from about 86 percent to about 96.5 percent have 6 ones, the new binary words from about 96.5 percent to just below 100 percent have 7 ones, and finally 100 percent of full scale, i.e., word number 256, has 8 ones, i.e., it comprises all ones.

The result is that when any one of the signals Y, R-Y, or B-Y is low (0 for Y, $-0.7$ for R-Y, $-0.9$ for B-Y), i.e., has a small number of ones and a large number of zeroes, then in accordance with the diamond diagram of FIG. 1 (or a similar one that can be drawn for B-Y v. Y), the other graphed signal will be about in the middle of its range, since the only physically realizable values are within parallelogram 0ABC (or its corresponding parallelogram on a B-Y v. Y graph). This means the other graphed signals will have about 4 ones. In addition, B-Y and R-Y cannot have large negative values simultaneously, thus ensuring that the 32-bit word from switch 90 will have at least 8 ones. In practice, there will normally be more than 8 ones, since the non-cosited Y signal normally provides a contribution of ones.

Figure 3:
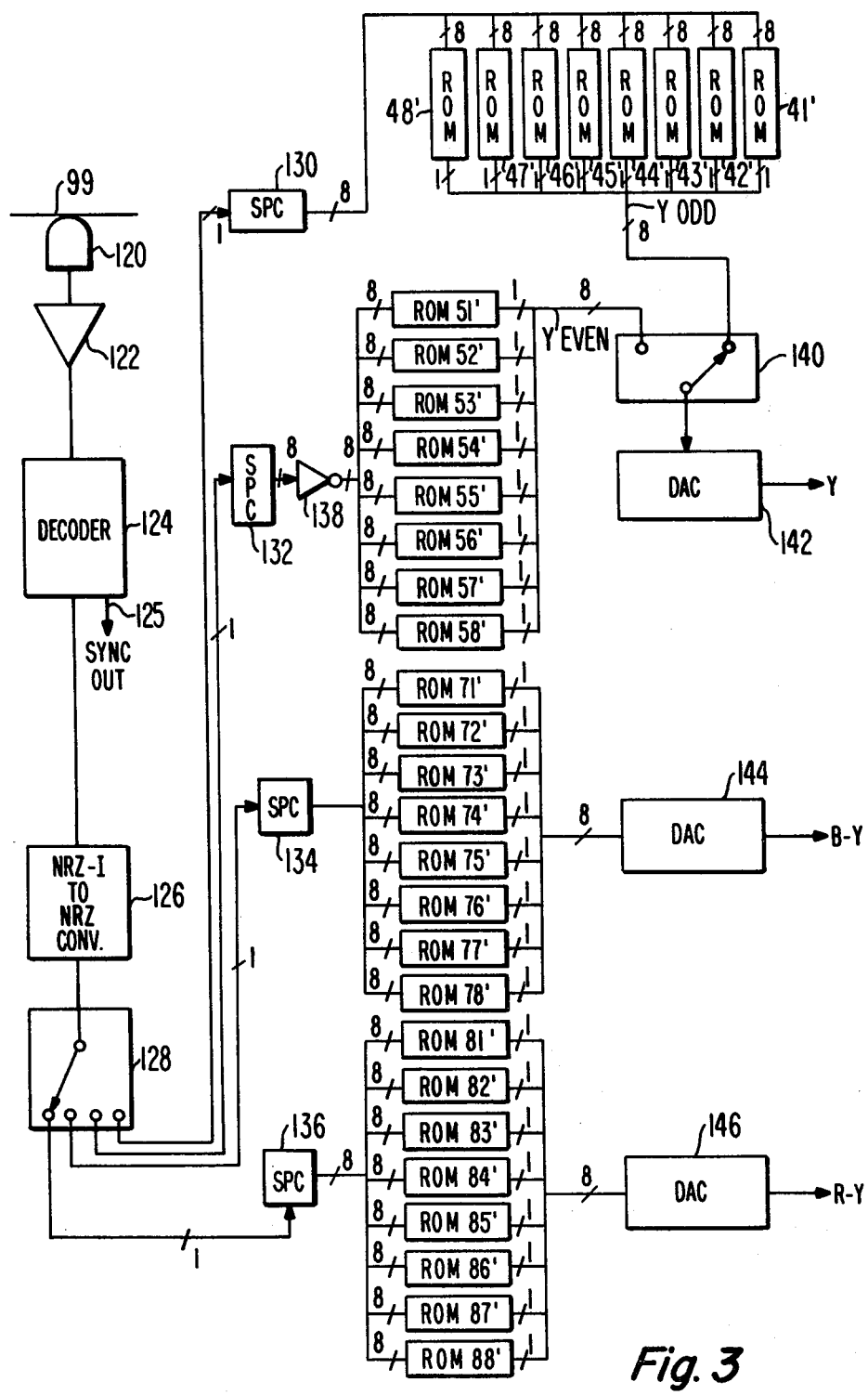
FIG. 3 is a block diagram of a reproducer-decoder for use with magnetic tape recorded with the apparatus of FIG. 2.

FIG. 3 shows a block diagram of a reproducer-decoder. Tape 99, which now has a signal recorded thereon by the apparatus of FIG. 2, is displaced past magnetic reproducing head 120, which head 120 converts the flux changes caused by the motion of tape 99 into electrical signals. These signals are then amplified by amplifier 122. The output signal from amplifier 122 is then applied to decoder 124 (described in detail below in conjunction with FIG. 4) that supplies NRZ-I signals to NRZ-I to NRZ converter 126 (described below in conjunction with FIG. 5), as well as sync signals at output 125, which actually comprises three outputs that are described below.

The serial 32-bit word NRZ signals are applied to a 1:4 demultiplexer 128, which successively applies the resulting serial 8-bit word $Y_{odd}$, $Y_{even}$, B-Y, and R-Y output signals to SPCs (series-to-parallel converters) 130, 132, 134, and 136, respectively. The SPCs can each comprise a shift register and each has an 8-bit parallel output. The 8-bit $Y_{even}$ signal from SPC 132 is applied to 8-bit inverter (8 inverters, one for each bit) to compensate for the action of inverters 61–68 of the recorder of FIG. 2.

The $Y_{odd}$ signal from SPC 130 is applied to ROMs 41' to 48', the $Y_{even}$ signal from inverter 138 is applied to ROMs 51' to 58', the B-Y signal from SPC 134 is applied to ROMs 71' to 78', and the R-Y signal is applied to ROMs 81' to 88'. ROMs 41' to 48' and 51' to 88', respectively, correspond to the unprimed ROMs having the same number in FIG. 2, and have the inverse transfer function of the unprimed ROMs, i.e., the primed ROMs convert the new binary code into standard binary. Further, the primed ROMs each have a 1-bit output. Thus, ROMS having a number ending in 1 provide the MSB of standard binary words, while ROMs having a number ending in 8 provide the LSB of standard binary words. ROMs ending in other numbers provide the appropriate intermediate bits.

The $Y_{odd}$ and $Y_{even}$ signals, now in standard binary form, are applied to 2:1 multiplexer 140 to form at its output a 16-bit parallel word Y signal having both odd and even samples. The Y signal is then applied to DAC (digital-to-analog converter) 142. The outputs of ROMs 71' to 78' are combined to form an 8-bit parallel B-Y word that is applied to DAC 144, while similarly the outputs of ROMs 81' to 88' are combined to form an 8-bit parallel R-Y word that is applied to DAC 146. The output signals from DACs 142, 144, and 146 are analog Y, B-Y and R-Y signals respectively, and are available for further processing, e.g., matrixing, before display, if so desired.

Figure 4:
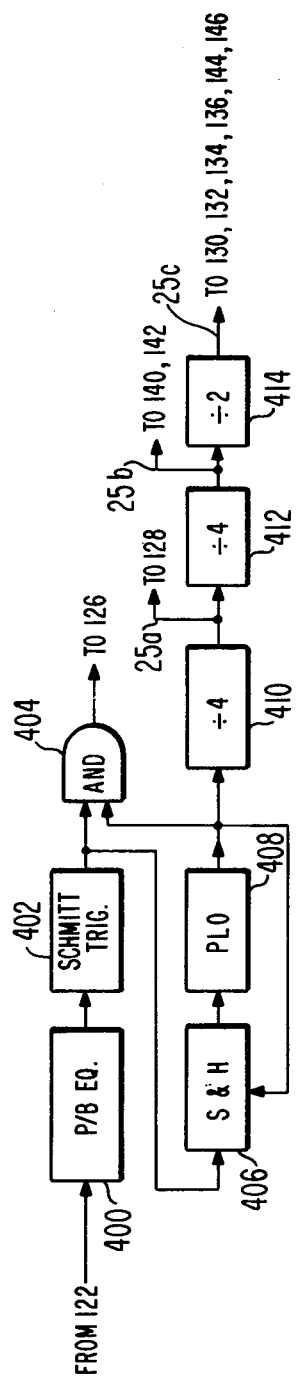
FIGS. 4 and 5 are block diagrams of circuits used in FIG. 3.

FIG. 4 shows the details of decoder 124 of FIG. 3. The signal from amplifier 122 of FIG. 3 is applied to a playback equalizer 400 to compensate for head and tape losses at various recording frequencies as is known in the art. The output signal from equalizer 400 is applied to Schmitt trigger 402, which "squares up" the reproduced pulses. The output signal from trigger 402 is applied to a first input of AND gate 404 and to sample and hold circuit 406 of a phase locked loop (PLL). The output signal from sample and hold circuit 406 is applied to PLO (phase locked oscillator) 408 that provides clock signals at the playback bit rate. Circuits 406 and 408 form the PLL. The output signal from PLO 408 is applied to circuit 406 to provide feedback for the circuit 408 and control the sampling and holding times of circuit 406 to the second input of gate 404, and to divide-by-four frequency divider 410. The output signal from gate 404 is applied to NRZ-I to NRZ converter 126. The output signal from divider 410 is applied to divide-by-four frequency divider 412 and also comprises output 25a that is applied for control to 1:4 demultiplexer 128. The output signal from divider 412 is applied to divide-by-two frequency divider 414 and also comprises output 25b that goes to 2:1 multiplexer 140 and to ADC 142 for control thereof. The output from divider 414 comprises output 25c, which is applied to SPCs 130, 132, 134, and 136 and to DACs 144 and 146 for synchronization.

Figure 5:
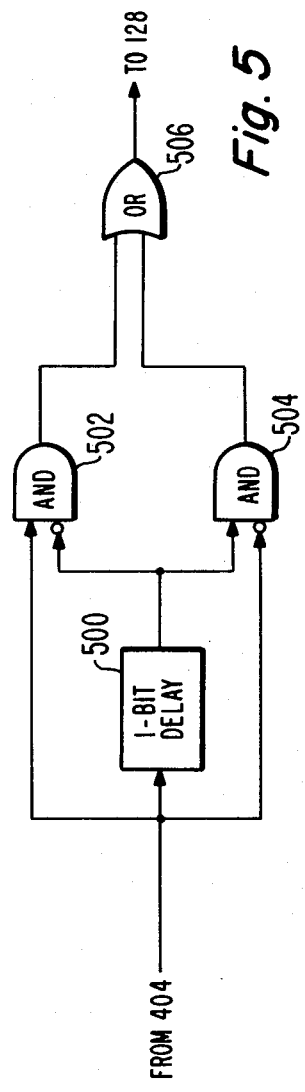

FIG. 5 shows a block diagram of the NRZ-I to NRZ converter 126 of FIG. 3. The output signal from gate 404 of FIG. 4 is applied to the input of 1-bit delay circuit 500, as well as to the non-inverting input of AND gate 502 and the inverting input of AND gate 504. Delay circuit 500, which can comprise a clocked flip-flop or a 1-bit delay line, has its output coupled to the inverting input of gate 502 and to the non-inverting input of gate 504. The output of gates 502 and 504 are respectively coupled to the inputs of OR gate 506. The output of gate 506 is coupled to 1:4 demultiplexer 128 of FIG. 3. Gate 502 provides a one output signal after the NRZ-I input signal goes from zero to one. Conversely, gate 504 provides a one output signal after the input signal goes from one to zero. Adding the two output signals by gate 506 provides NRZ signals.

What is claimed is:

1. A method of transmitting a plurality of at least partially correlated digital words wherein some combinations of said plurality of words are physically unrealizable and some combinations of said plurality of words are physically realizable, said method comprising assigning code words to said digital words such that code words having digits substantially all of the same selected level are avoided in the assignement of code words to physically realizable combinations of said digital words, and transmitting said assigned code words in non-return-to-zero format.

2. Apparatus for transmitting a plurality of at least partially correlated digital words wherein some combinations of said plurality of words are physically unrealizable and some combinations of said plurality of words are physically realizable, said apparatus comprising assigning means responsive to said digital words for assigning code words to said digital words such that code words having digits substantially all of the same selected level are avoided in the assignment of code words to physically realizable combinations of said digital words, and transmitting means for transmitting said assigned code words in non-return-to-zero format.

3. Apparatus as claimed in claim 2, wherein said plurality of digital words comprise a luminance signal and a pair of color difference signals.

4. Apparatus as claimed in claim 3, wherein said color differance signals comprise R-Y and B-Y signals.

5. Apparatus as claimed in claim 3, further comprising means coupled to said assigning means for separating said luminance signal into a pair of luminance signals comprising alternately occurring digital words.

6. Apparatus as claimed in claim 5, wherein said assigning means comprises four pluralities of read only memories for said pair of luminance signals and said R-Y and B-Y signals respectively.

7. Apparatus as claimed in claim 6, wherein each of said digital words comprise 8-bits, and each of said plurality of memories numbers eight.

8. Apparatus as claimed in claim 2, wherein said assigning means comprises a plurality of read only memories.

9. Apparatus as claimed in claim 2, wherein said transmitting means comprises means for recording said code words.

10. Apparatus as claimed in claim 2, further comprising converting means for receiving said code words and for converting said code words into standard digital words.

11. Apparatus as claimed in claim 10, wherein said converting means comprises a plurality of read only memories.

12. A record made in accordance with the method of claim 1.

13. A method as claimed in claim 1 wherein said transmitted format is non-return-to-zero-interleaved.

14. Apparatus as claimed in claim 2 wherein said transmitted format is non-return-to-zero interleaved.

15. Apparatus for transmitting a combination of at least first and second digital words having values within first and second ranges, respectively, said first and second digital words being at least partially correlated such that when said first digital word has a value in a third range of values within said first range which third range of values includes an extreme value of said first range, said second digital word has a value within a fourth range of values within said second range of values, which fourth range of values does not include an extreme value of said second range, said apparatus comprising:

assigning means responsive to said digital words for assigning code words to said combination of said digital words such that code words having digits substantially all of the same selected level are avoided in the assignment of code words to said combinations of said first and second digital words which have values lying within said third and fourth ranges, respectively, and transmitting means for transmitting said assigned code words in a non-return-to-zero format.

16. Apparatus as claimed in claim 15 wherein said transmitted format is non-return-to-zero-interleaved.

* * * * *